(12) United States Patent
Fu

(10) Patent No.: US 7,914,224 B2
(45) Date of Patent: Mar. 29, 2011

(54) CONNECTING STRUCTURE FOR HAND-OPERATED TOOLS AND HANDLES

(76) Inventor: Changzhi Fu, Shundaokou (CN)

( * ) Notice: Subject to any disclaimer, the term of this patent is extended or adjusted under 35 U.S.C. 154(b) by 197 days.

(21) Appl. No.: 12/098,949

(22) Filed: Apr. 7, 2008

(65) Prior Publication Data

US 2009/0107307 A1    Apr. 30, 2009

(30) Foreign Application Priority Data

Oct. 30, 2007   (CN) .......................... 2007 1 0139669

(51) Int. Cl.
*F16B 9/00*    (2006.01)
(52) U.S. Cl. ......... 403/241; 403/234; 403/237; 403/260
(58) Field of Classification Search .................. 403/234, 403/237, 241, 244, 258, 260, 294, 306
See application file for complete search history.

(56) References Cited

U.S. PATENT DOCUMENTS

| | | | | |
|---|---|---|---|---|
| 1,357,763 A * | 11/1920 | Collins | ........................ | 403/235 |
| 1,374,336 A * | 4/1921 | Surbaugh | ..................... | 403/244 |
| 1,777,809 A * | 10/1930 | Vern | ............................. | 172/372 |
| 1,807,883 A * | 6/1931 | Webster | ....................... | 403/241 |
| 1,829,002 A * | 10/1931 | Gillogly | ........................ | 111/101 |
| 1,906,906 A * | 5/1933 | Greider | .......................... | 30/299 |
| 1,931,926 A * | 10/1933 | David et al. | ..................... | 30/169 |
| 1,936,264 A * | 11/1933 | Ready | ............................ | 403/244 |
| 1,945,430 A * | 1/1934 | Garrett | ............................. | 403/66 |
| 2,007,536 A * | 7/1935 | Knott | ............................ | 15/144.1 |
| 2,013,626 A * | 9/1935 | Cowdery | ........................ | 294/49 |
| 2,030,550 A * | 2/1936 | Smith | ............................ | 403/312 |
| 2,117,095 A * | 5/1938 | Alexander | ..................... | 403/237 |
| 2,262,648 A * | 11/1941 | Peterson et al. | ................. | 294/57 |
| 2,285,629 A * | 6/1942 | Turner | .......................... | 403/244 |
| 2,397,571 A * | 4/1946 | Michael | ....................... | 30/164.5 |
| 2,507,881 A * | 5/1950 | Bennett | ........................ | 403/301 |
| 2,511,160 A * | 6/1950 | Grobowski | ..................... | 16/437 |
| 3,078,491 A * | 2/1963 | Ames | ........................... | 15/245.1 |
| 3,369,830 A * | 2/1968 | Meyerhoefer | ................ | 403/238 |
| 3,404,412 A * | 10/1968 | Ryan | ................................. | 7/116 |
| 3,474,535 A * | 10/1969 | Kramer | ............................ | 30/315 |
| 3,848,915 A * | 11/1974 | Wherry | .......................... | 294/49 |
| 3,961,790 A * | 6/1976 | Milligan | ....................... | 473/561 |
| 4,023,606 A * | 5/1977 | Kneissl | ......................... | 30/308.1 |
| 4,208,793 A * | 6/1980 | Sinnott | ............................ | 30/299 |
| 4,432,404 A * | 2/1984 | Clark et al. | ................. | 30/308.3 |
| D343,102 S * | 1/1994 | Tanner | ............................ | D8/10 |
| 6,357,067 B1 * | 3/2002 | Jones | ................................. | 7/116 |

\* cited by examiner

*Primary Examiner* — Victor MacArthur
(74) *Attorney, Agent, or Firm* — Harris Shelton Hanover Walsh; Susan B. Fentress; Cong Ding

(57) ABSTRACT

This invention is generally directed to a new connecting structure for connecting the bodies of hand-operated tools to their handles. It solves the technical difficulty in standardizing the connection of hand-operated tools and handles. The technical strategy involves separating the connecting structure to the connecting segment and handle fix segment. The axial opening of the handle fix segment fits the shape of handle, and handle is installed into the handle fix segment. The present invention has the advantages of simple design, convenience for mass manufacture, ease and reliability in connecting, assembling, and adjusting standardized connection process, and cost-efficiency in production and transportation.

3 Claims, 5 Drawing Sheets

A—A

A-A

B-B

US 7,914,224 B2

CONNECTING STRUCTURE FOR HAND-OPERATED TOOLS AND HANDLES

RELATED APPLICATION

This application claims the benefit of Peoples' Republic of China application Serial No. 200710139669.9, filed Oct. 30, 2007, hereby specifically incorporated by reference in its entirety.

FIELD OF THE INVENTION

This invention is generally directed to a new connecting structure for hand-operated tools and handles. This document details the configuration of the connecting structure that connects the hand-operated tools and handles and provides a suitable manufacturing process.

BACKGROUND OF THE INVENTION

Hand-operated tools, such as shovels, picks, hoes, and rakes, are commonly used in both businesses and daily living activities. The conventional way to connect a handle with a tool has been to fit the front tip of the handle to the connecting structure by cutting and assembling the handle into the connecting structure of the tool. The stability of the connection depends on how the handle tip fits with the connecting structure. Sometimes nails or screws are used to increase the stability. Such connecting structures are usually manufactured in the same process as the tools, and this increases the production difficulty. It is usually an inconvenient task to fit the handle with the connecting structure of the tool. Moreover, the connection between the handle and connecting structure usually loosens with time, and it is not easy, sometimes impossible, to refit or readjust the connection. A handle is usually discarded when part of the hand-operated tool with which it was connected is broken, which not only is wasteful but also becomes an environmental burden. Another shortcoming of the current method for connecting hand-operated tools is that the handles and tools are often connected in a factory with shapes and sizes that are usually inconvenient for transportation.

Often, handles are constructed out of wood to fit the tool better. However, the limitation of wood as a resource has forced manufactures to look for other materials, such as plastic and other nonmetal synthetic materials, as possible alternative handle materials. Recently, plastic and other nonmetal synthetic materials have been used extensively because they have the advantages of lightness, strength and elasticity, durability, and recyclability. An improvement to the method of fitting the connecting structure with the handle, such as the present invention, will make tremendous improvements to the manufacturing of hand-operated tools. Moreover, it will enable the fitting process to be conducted away from the manufacturing site, solving the problem of difficulty in transportation due to the peculiar shape of the assembled tool and easing the readjustment of the connection whenever necessary. Finally, the materials used for handles, wood, plastic and other nonmetal synthetic materials, would be recyclable and environmentally friendly.

SUMMARY OF THE INVENTION

This invention is directed to a new connecting structure for hand-operated tools and handles, aiming to overcome the technical difficulty in non-standardized connections of hand-operated tools and handles. Technical approaches in the present invention include separating the whole hand-operated tool to parts, including the functional body, handle, and the handle connecting structure that connects the functional body and handle. One end of the connecting structure is the connection segment, used to fasten and connect to the functional part; the other end is the handle fix segment which connects to the handle through the insertion of the handle into an axial opening in the handle fix segment.

The transverse section of the handle fix segment takes the shape of an arc with circumference longer than half of the handle perimeter. In order to have the handle receive strength evenly, reinforcing split with an arc shape is designed and employed. The handle is clamped between the handle fix segment and the handle reinforce split, with all three fixed together by a connecting bolt.

The present invention has the advantages of a simple design, reliable connection between handle and the handle fix segment, convenience in adjusting the connection whenever necessary, conductivity to standardized and mass production, and ease of handle production in materials other than wood, not only reducing the cost in manufacturing but also solving many transportation difficulties.

Elements in the figures are represented by the numbers as follows; 1—function body of the hand-operated tool, 2—connecting segment of the connection structure, 3—handle fix segment, 4—handle, 5—connecting bolt, 6—arc shaped reinforcing splint, 7—handle tip.

DETAILED DESCRIPTION OF THE PREFERRED EMBODIMENTS

Figure 1:
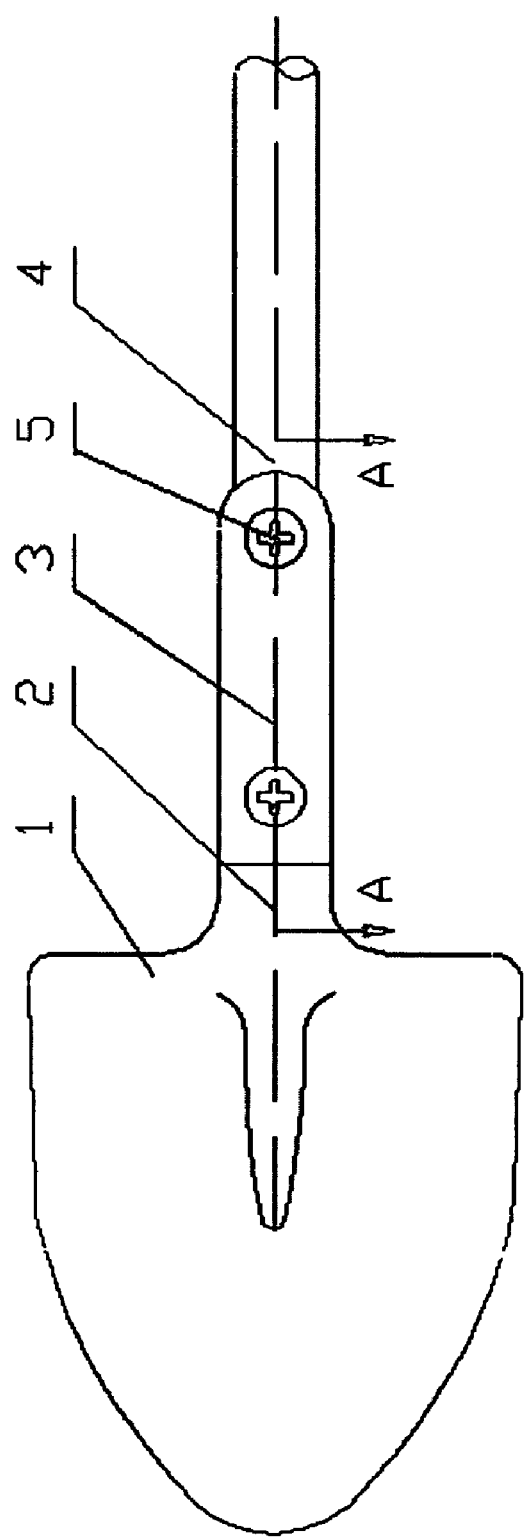
FIG. 1 is a front elevation view of the present invention in a shovel.

As shown in FIG. 1, the shovel consists of a tool body 1 (shovel), handle 4, and the connecting structure integrated with the tool body. The tool body 1 (shovel) integrates the connection segment 2 with the connecting structure. To fit the handle, the handle fix segment 3 is designed with a barrel shape axial opening, handle 4 is inserted and fixed in the handle fix segment 3, and through the connecting structure, the tool body 1 is connected together with the handle 4.

The present connection structure is lengthened, in comparison to the conventional connection structure, to ease the manufacturing of the connection structure. The handle fix segment 3 is produced with a barrel-shape axial opening to facilitate the assembly and fastening of the handle fix segment 3 and handle 4.

Figure 3:
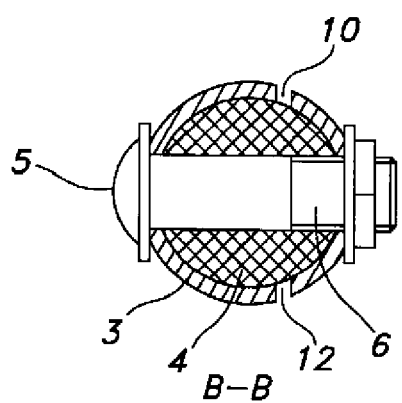
FIG. 3 is a cross section view taken at section B-B of FIG. 2.
Figure 4:
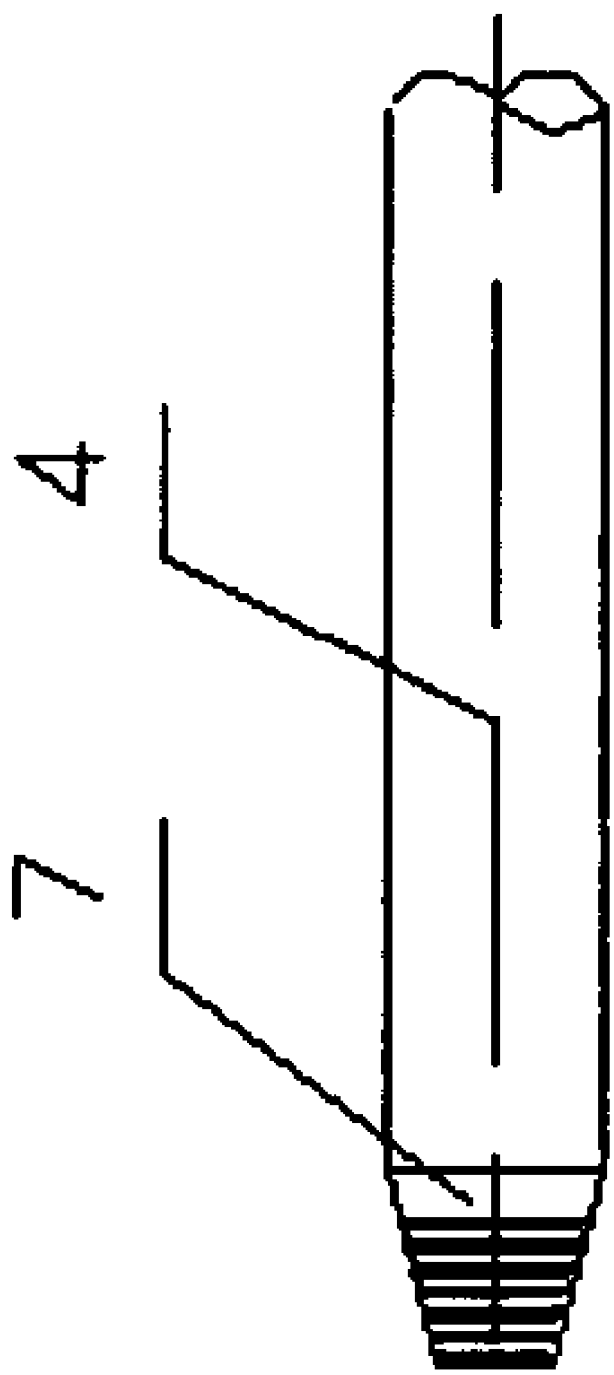
FIG. 4 is a front or side view of a handle.
Figure 5:
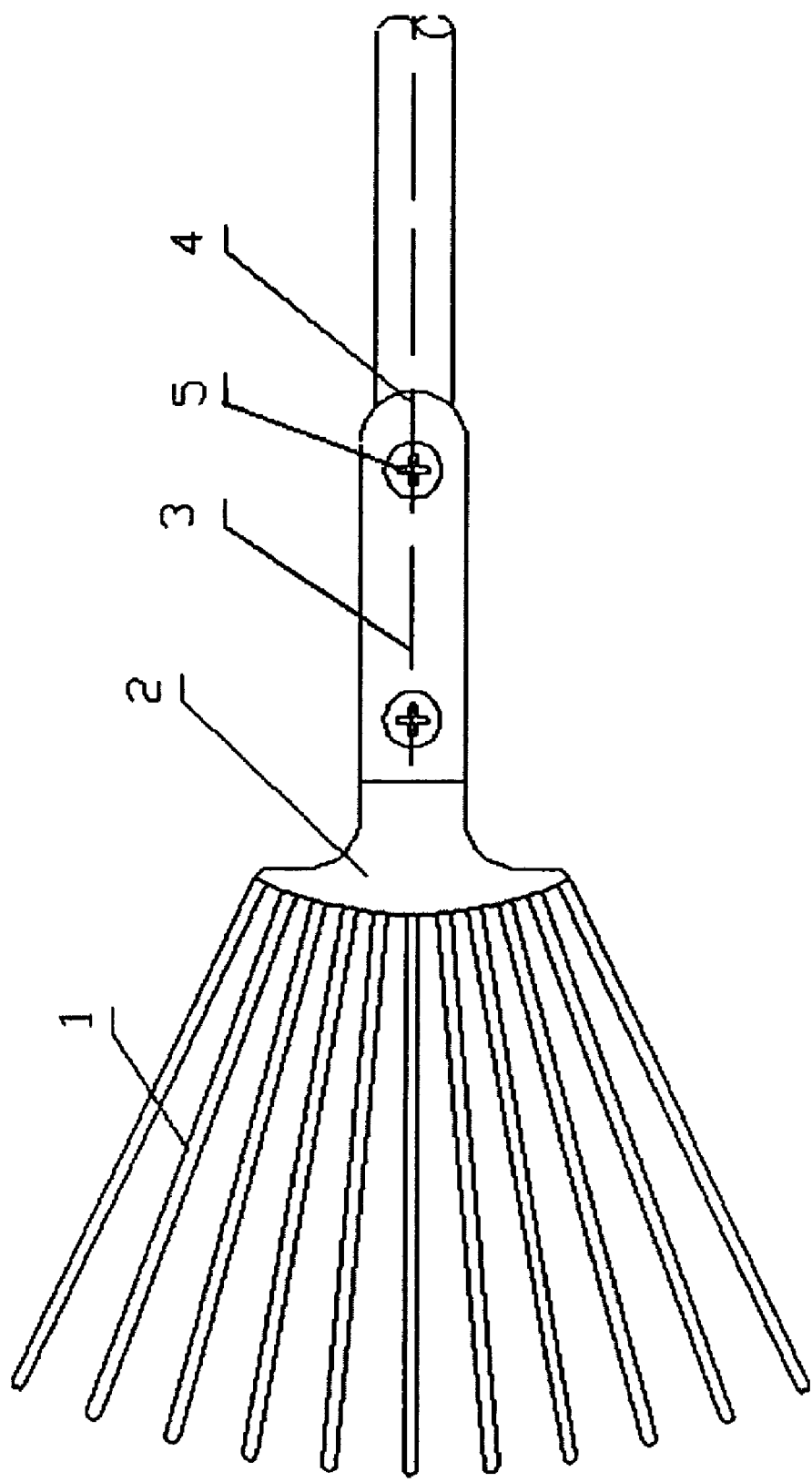
FIG. 5 is a front elevation view of the present invention in a pronged tool.
Figure 6:
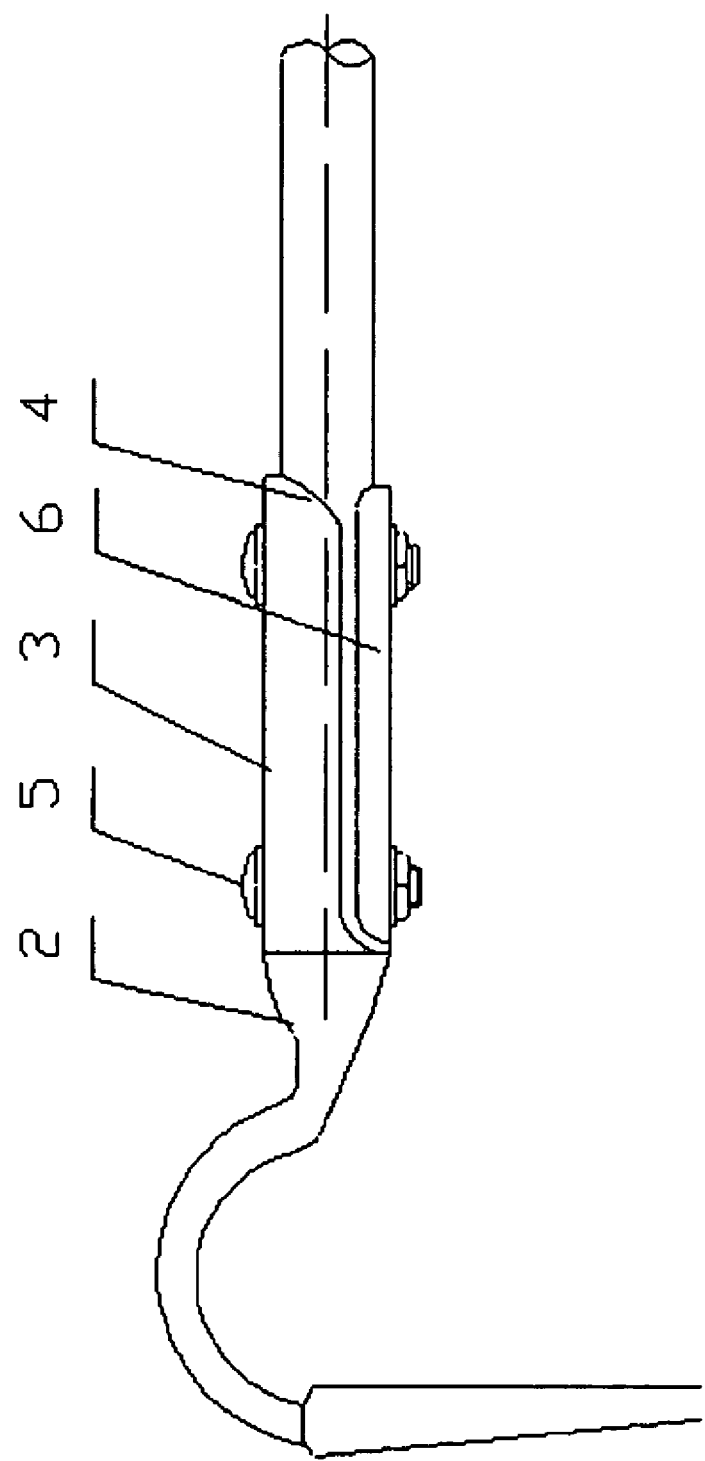
FIG. 6 is a side elevation view of the present invention in a pick or a hoe.

As shown in FIGS. 1 and 3, the transverse section of the handle fix segment 3 takes the shape of an arc with circumference length longer than half of the perimeter 10 of the handle 4. Handle 4 is inserted into the handle fix segment 3 arc, and the handle 4 is fastened into the handle fix segment 3 by reinforcing splint 6 and the connecting bolts 5.

Figure 2:
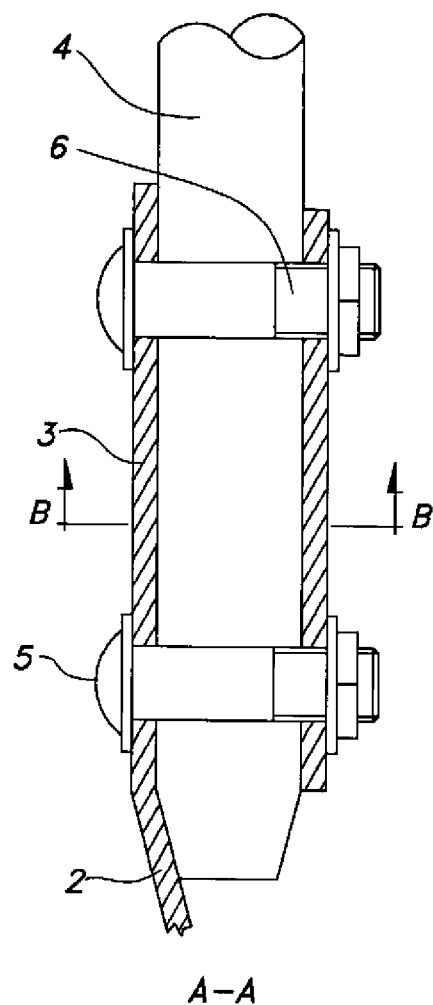
FIG. 2 is a cross-section view of the elevation of section on A-A of FIG. 1.

As shown in FIGS. 2 and 3, the present invention includes a design of an arc shaped reinforcing splint 6 to distribute the clamping force of the connecting bolts 5 along the handle fix segment 3. The arc circumferential length of the arc shaped reinforcing splint 6 is shorter than half of the handle 4 perimeter 12. A double arc transition form is used to fit the arc shaped reinforcing splint 6 and the connecting segment 2. The handle fix segment 3 and the arc shaped reinforcing splint 6 hold the handle 4, and the three parts are fixed together by a connecting bolt 5. The arc shaped reinforcing splint 6 enhances the handle fix segment 3 and prolongs the lifetime of the tool.

As shown in FIG. 3, the present invention uses a square head of bolt 5 and square nut in the handle fix segment 3 to prevent the bolt from loosening from repeated usage. The square head and square nut at arch shaped reinforcing splint 6 prevent the bolts 5 from moving out of place.

In the connecting structure of present invention, handle 4 takes a cylindrical shape. In order to have the cylindrical handle 4 fit with the handle fix segment 3 of the connection segment 2 properly, a tapered partial frustoconical handle tip 7 in the connecting end of the handle is designed. The handle tip 7 is inserted into a matching tapered socket of the connection segment 2. The handle tip 7 helps to locate the handle 4 in connecting segment 2.

According to the manufacture's discretion, the locating plunger 7 and handle 4 can be produced separately or jointly. The user needs to assemble the handle tip 7 to handle 4 if they are produced separately.

In order to increase frictional resistance between handle tip 7 and connection segment 2, a group of annular embossments on the surface of handle tip 7 is designed.

The connecting structure for hand-operated tool in the present invention can be used in shovels, picks, hoes, and rakes as shown in the figures. The structure can also be used in other tools such as garden scissors, mops, etc.

By employing the present invention, the connection between hand-operated tool and its handle can be standardized. In addition, the connection can be applied and adjusted in any working field through the connecting bolts 5, and a defective tool body of a hand-operated tool or handle can be replaced easily.

What is claimed is:

1. An apparatus comprising;
    a straight handle having a perimeter and an integrally formed tool body consisting of a functional end and a connecting structure;
    the connecting structure consisting of a connection segment and a handle fix segment;
    wherein the connection segment includes a partial frustoconical socket, said partial frustoconical socket is located between the functional end of the tool body and the handle fix segment; the handle fix segment having an internal transverse cross-sectional arc length of greater than one half a circumference of the handle perimeter;
    a reinforcing splint with an internal transverse cross-sectional arc length of less than one half a circumference of the handle perimeter wherein the connection segment and the reinforcing splint form a symmetrical double arc;
    a plurality of holes through the reinforcing splint and the handle fix segment oriented at right angles and passing through the axis of the reinforcing splint and the handle fix segment; and wherein the functional end of the tool body is reversibility selected for the group consisting of: shovel, rake, hoe and pick;
    and a plurality of bolts and nuts to reversibly affix said handle between the handle fix segment and the reinforcing splint.

2. The apparatus of claim 1 wherein said handle has a handle tip adapted to seat in the partial frustoconical socket.

3. The apparatus of claim 2 further comprising: an annular embossment on the handle tip.

\* \* \* \* \*